United States Patent

[11] 3,593,055

[72] Inventors Joseph E. Geusic
 Berkeley Hts.;
 Henry E. D. Scovil, New Vernon, both of, N.J.
[21] Appl. No. 816,763
[22] Filed Apr. 16, 1969
[45] Patented July 13, 1971
[73] Assignee Bell Telephone Laboratories, Incorporated
 Murray Hill, Berkeley Heights, N.J.

[54] ELECTRO-LUMINESCENT DEVICE
 9 Claims, 3 Drawing Figs.
[52] U.S. Cl. .................................................. 313/108 D,
 317/235 N, 250/217 SS, 250/71 R
[51] Int. Cl. ............................................................ H05b 33/00
[50] Field of Search ............................................ 313/108 D;
 250/88, 77, 213; 317/235/27; 252/301.4; 331/94.5

[56] References Cited
 UNITED STATES PATENTS
| | | | |
|---|---|---|---|
| 2,861,165 | 11/1958 | Aigrain et al. | 317/235 X |
| 3,302,051 | 1/1967 | Galginaitis | 317/235 X |
| 3,304,430 | 2/1967 | Biard et al. | 317/235 X |
| 3,397,316 | 8/1968 | Brown et al. | 250/213 |
| 3,462,605 | 8/1969 | Engeler | 317/235 X |
| 3,473,067 | 10/1969 | Rittmayer | 317/235 X |

OTHER REFERENCES

Hewes et al., Paper HK7, BULLETIN OF THE AMERICAN PHYSICAL SOCIETY, Series 2, Vol. 13, No. 4, pages 687— 688 (1968)

Primary Examiner—John W. Huckert
Assistant Examiner—William D. Larkins
Attorneys—R. J. Guenther and Edwin B. Cave ABSTRACT: Increased light output results from certain design modifications in a GaAs infrared emitting diode coated with a phosphor for converting this emission to visible light. These design modifications include shape and dimensional considerations for minimizing internal reflection and absorption of infrared emission within the diode as well as dimensional and compositional considerations as applied to the coating for reducing scattering losses and minimizing internal reflection of its emission.

PATENTED JUL 13 1971  3,593,055

INVENTORS J.E. GEUSIC
H.E.D. SCOVIL
BY
*George S. Indig*
ATTORNEY

ELECTRO-LUMINESCENT DEVICE

BACKGROUND OF THE INVENTION

1. Field of the Invention

The invention is concerned with electroluminescent devices in which visible light output results from up conversion of infrared emission.

2. Description of the Prior Art

Two distinct classes of junction type electroluminescent devices are presently under study. The first of these utilizes a gallium phosphide junction diode. When properly doped and biased this diode directly emits visible light. The most efficient of these devices emits at a red wavelength (6900 A.)

The second class of devices utilizes a forward biased silicon-doped gallium arsenide diode. Internal emission efficiency in such a device is an order of magnitude higher than that of the best GaP device. Unfortunately, such emission is at an infrared wavelength. A recently introduced device utilizes a GaAs diode with a coating of an up-converting phosphor. One such coating contains $Yb^{3+}$ and $ER^{3+}$ in a matrix of lanthanum fluoride. This material converts the infrared emission to visible emission by a stepwise process involving two or more photons (sometimes called a "second photon" process).

External emission from GaAs infrared emitting diodes may be disappointingly low. Mostly, inefficiency is due to internal reflection GaAs typically has a refractive index of 3.5 ) coupled with a significant absorption within the GaAs for its own emission.

Increased external infrared emission has resulted by use of a diode designed to reduce internal reflection. This diode generally takes the form of a hemisphere with the junction region being confined to a center portion of the flat underside of the hemisphere. Such structures have resulted in an increase in external infrared emission.

Hemispherical devices coated with the up-converting phosphor also show an improvement in overall efficiency. This improvement is due to the same reduction in internal reflection of infrared emission and concommitant reduction in absorption loss prior to conversion. Overall efficiency realized from a visible green light emitting diode of such construction compares favorably with the best GaP devices. However, postulated efficiency based on measured phosphor conversion efficiency and expected infrared emission has not achieved.

Summary of the Invention

Structural and compositional modifications incorporated in coated gallium arsenide junction diodes result in improved overall efficiency for the emission of visible radiation.

Various structural modifications take advantage of the fact that the mismatch in refractive index between the semiconductor material and the phosphor conversion material is less than that at a semiconductor-air interface. While certain ancillary configuration modifications are suggested, a fundamental design change, based on the lessened mismatch, takes the form of a reduction in dome size. The reduction in dome size under optimum conditions nevertheless permits the same amount of infrared emission to escape from the gallium arsenide into the phosphor (as compared with that escaping at a semiconductor-air interface). Since the conversion mechanism is based on second photon or a higher order photon transition, the visible output intensity is dependent on a second or higher order function of the intensity of the infrared illumination. For given conditions, this intensity is, of course, increased for the smaller dome surface and the result is a significant improvement in brightness of visible emission. In a typical case for a simple structure in accordance with the invention improvement is by a factor of about 5.

Other structural innovations are described for phosphors having low infrared absorption for the wavelength emitted by the diode and still others are concerned with reduction of internal reflection at the phosphor-air interface. (While the visible phosphor emission is typically not strongly absorbed by the phosphor per se, reflected rays may pass into the diode where absorption is significant.)

Improvements, in accordance with the invention, include those which facilitate interfacial transmission by means of graded dielectric layers. Others result in reduced scattering losses both at layer interfaces and within particulate materials by use of generally amorphous matrix materials having refractive indices approaching those of the particles.

DETAILED DESCRIPTION

1. FIG. 1

Figure 1:
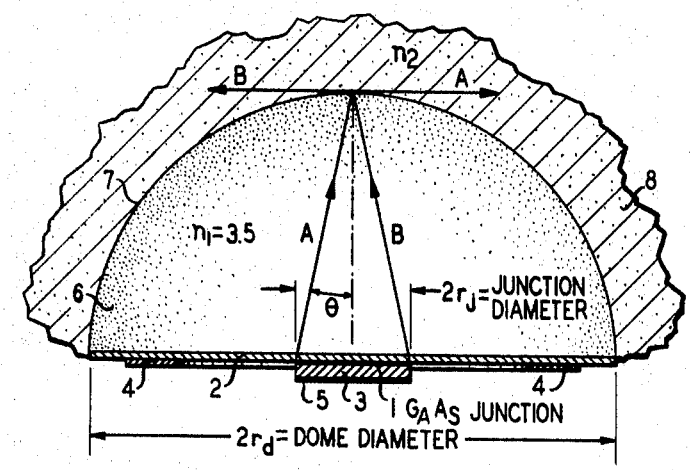
FIG. 1 is a front elevational view in section of a coated gallium arsenide device in accordance with the invention.

The configuration of FIG. 1 is first described in physical terms after which the same figure serves as the basis for a discussion of dimensional considerations designed to optimize operation.

The structure of FIG. 1 includes a P-N junction 1 corresponding with a common interfacial region between solution growth P-type gallium arsenide layer 3. One or both of layers 2 and 3 are doped with element such as silicon, perhaps admixed with indium to modify the band gap and so produce infrared emission of the desired wavelength. In operation, junction 1 is forward biased to its emitting state by means of ring shaped cathode 4 and anode 5 biased by means not shown. Infrared emission so produced passes through N-type bulk gallium arsenide or other refractive index matched material region 6 and thence through interface 7 into a phosphor layer, a broken section of which is shown as 8. Phosphor 8 serves the function of converting the GaAs infrared emission into radiation in the visible spectrum. Such radiation eventually passes through the outer surface of layer 8 into the ambient or into another medium. In the former case the layer's outer surface may also be dome shaped to minimize internal reflection of visible radiation.

A detailed description of the gallium arsenide junction and/or of the phosphor material is not considered within the appropriate scope of the description. With respect to the diode composition, however, overall efficiency may be improved by adjusting the band gap so as to result in emission of a wavelength corresponding with a strongly absorbing region within the phosphor. Silicon-doped GaAs diodes characteristically emit at a wavelength of about $0.93\mu$ (micron) while phosphors, now considered for use as conversion materials, characteristically absorb most strongly at somewhat greater wavelength—typically from $0.94\mu$ to $0.98\mu$. It is known that supplemental doping by indium may increase the wavelength of infrared emission (Vol. 172, No. 3, Physical Review Letters, Aug. 15, 1968). An appropriate diode compositional range may be defined as $Ga_{11x}In_xAsSi$, in which $x$ is from 0 to 0.1. Silicon doping levels not specified in the above formula are characteristically at from about $10^{17}/cm.^3$ to $10^{18}/cm.^3$.

With respect to phosphor layer 8, optimization, of course, places certain demands on composition. Resulting compositional considerations are not, per se, part of this invention but must be considered in the overall design of the device. Very briefly, phosphor layer 8 depends on a second photon or higher order photon transition and generally involves two closely coupled ions, one of which serves as the sensitizer (or absorbing ion) and the other of which serves as the activator (or emitting ion). Up-converting phosphor compositions particularly useful in conjunction with infrared-emitting gallium arsenide diodes utilize trivalent ytterbium as the sensitizer and trivalent erbium as the activator. Other activators which may be incorporated in lieu of erbium include the trivalent ions of holmium and thulium. Erbium-holmium mixtures may also be useful.

2. Design Considerations

From the standpoint of FIG. 1, it is significant to note that the refractive index of gallium arsenide for infrared emission of the concerned wavelength is about 3.5. This index, designated $n_1$, is included on the figure. Phosphor material 8 has a refractive index for the same infrared wavelength designated $n_2$ which, while characteristically less than that of the GaAs, is significantly greater than that of air. A representative value is about 2, and this index is a reasonable approximation for most phosphor materials known to be under study for this purpose at this time. Illustrative phosphor materials falling within this general index value are lanthanum fluoride, the barium ytterbium halides, and various mixed anion materials such as oxyhalides of a range of stoichiometries in which the halogen to oxygen ratio is 1:1 or higher. All such materials, of course, contain sensitizer and activator ions as dopants where either or both are not included as part of the nominal composition.

The relative dimension of the dome 6 and the junction 1 are discussed in terms of the extremal rays A and B since the direction of these rays define the angle, $\theta$, most divergent from a radial direction. If these rays emerge tangential to interface 7, internal reflection is just avoided. This condition occurs if $\sin \theta = \frac{n_2}{n_1}$ and if $$\frac{r_j}{r_d} = \tan \theta = \tan\left(\sin^{-1} \frac{n_2}{n_1}\right) \quad (1)$$

where $r_j$ equals the radius of the junction 1 and $r_d$ equals the radius of the dome 6.

Presently available gallium arsenide infrared dome structures are most effective in avoiding internal reflection when $r_d$ is numerically at least equal to 3.35 $r_j$ approximately equal to 70 percent transmission of radiation emanating from the junction–30 percent internal reflection). The above relationship, of course, prescribes only a minimum $r_j/r_d$ ratio since further relative increase in dome size results in extremal rays which still more closely approach the radial direction. Within reasonable limits, increase in dome size of such infrared devices is, therefore, not considered disadvantageous.

Both the conversion mechanism of the phosphor and its refractive index give rise to a departure from the established design criteria of the infrared diode. As noted, the conversion mechanism is such that efficiency generally varies as the second or higher order power of illumination intensity. Accordingly, dome miniaturization results in far more than linear improvement in brightness (assuming constant total illumination). Secondly, since the refractive index of the phosphor is greater than that of air, tangential transmission of the extremal rays occurs for smaller $r_j/r_d$ ratios. For a phosphor index where $n_2$ is equal to 2, the $r_j/r_d$ ratio is equal to about 1/1.45.

The resulting improvement in power output (visible output) may be determined from the relationship $$P_V = c \frac{(P_I)^\alpha}{A} \quad (2)$$

where $P_V$ is the power of the visible output,
$P_I$ is the power of the exciting infrared emission incident on the GaAs-phosphor interface,
$A$ is the area of that interface, and
$c$ is a constant of the phosphor. The power $\alpha$ to which $P_I$ is raised is dependent upon the nature of the multiphoton transition. For the phosphor materials of immediate interest, emission may result by a second photon process at a green wavelength or be a combination of processes involving third photon processes at red or blue wavelengths. For a pure second photon process, $\alpha$ is numerically equal to 2, and this value is assumed in the remainder of this section. However, since that part of the conversion dependent on a third photon process varies in efficiency as the cube power $P_I$, it should be understood that the described improvement is minimal and that dome reduction results in still greater improvement in visible brightness to the extent that higher order photon transitions are involved.

The relationship between $P_V$ and $P_I$ is set forth in equation (2). For a $r_j/r_d$ ratio of 1/1.45, the relationship of this equation is equal to $$c \frac{P_I^2}{2\pi(1.45 r_j)^2}.$$

The improvement realized for a dome designed with an $r_j/r_d$ ratio of 1/1.45 as compared with available infrared diodes of smallest possible size providing for tangential extremal rays (still assuming a pure second photon process) is equal to $\frac{(3.35)^2}{(1.45)^2} = 5.3$. This improvement is premised on otherwise identical dimensions, compositions, and pump levels.

3. FIG. 2.

Under appropriate circumstances where the phosphor layer 8 of FIG. 1 absorbs strongly at the infrared and is transparent at the visible emission wavelength, the layer may be of such thickness as to prevent substantial internal reflection of its visible radiation. Design considerations are similar to those discussed with extremal rays being defined as those tangential to interface 7 (since these depart in greatest amount from the radial direction). For a refractive index within the phosphor of about 2 and assuming an ambient index of 1, this gives rise to a minimum phosphor radial layer thickness of about 0.75 times the radius of the diode dome. If the phosphor absorption level for the concerned infrared wavelength is appropriate (i.e., absorption occurs in a radial thickness smaller than above), this design approach is indicated. Under other circumstances, where the phosphor is not sufficiently transparent to its visible emission or the infrared absorption is not sufficiently strong, it may be desired to modify the structure still further from the prototype shown in FIG. 1.

Figure 2:
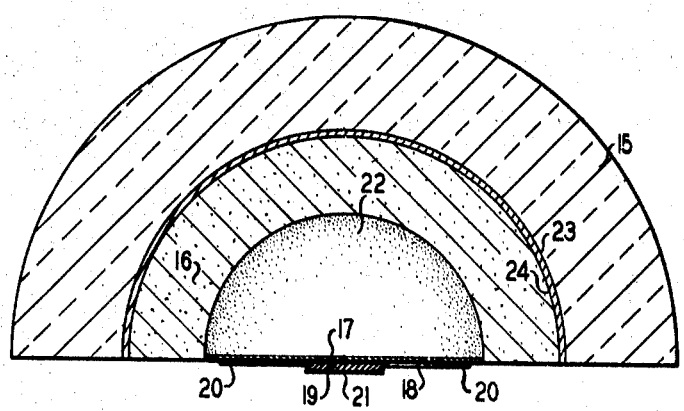
FIG. 2 is a front elevational view in section of a device similar to that of FIG. 1 but provided with an additional element for maximizing transmission at an ultimate air interface.

FIG. 2 is concerned with the situation in which, by reason of significant visible absorption in the phosphor or for other reasons which may include economic considerations, it is undesirable to utilize a phosphor layer thickness of the indicated minimum dimension. The structure shown includes an additional layer 15 which has an index of refraction approaching that of the phosphor layer 16. Inner portions of the device are similar to those of FIG. 1 and include a gallium arsenide junction 17 defined between N-type region 18 and P-type region 19. This junction is, again, forward biased by means of ring cathode 20 and anode 21 biased by means not shown. Inner dome 22 may, again, be constructed of bulk N-type gallium arsenide or other index-matched material. Optional layer 23, lying without outer surface 24 of phosphor 16, is a multilayer dielectric coating which is highly reflective at the infrared wavelength of the diode but is highly transparent to the visible wavelength/s emitted by phosphor 16.

Thickness of index-matched layer 15 may be computed on the basis of the relationships set forth in conjunction with the description in FIG. 1. The minimum desired thickness for phosphor 16 is that which results in nearly complete absorption of the infrared emission.

4. FIG. 3

Figure 3:
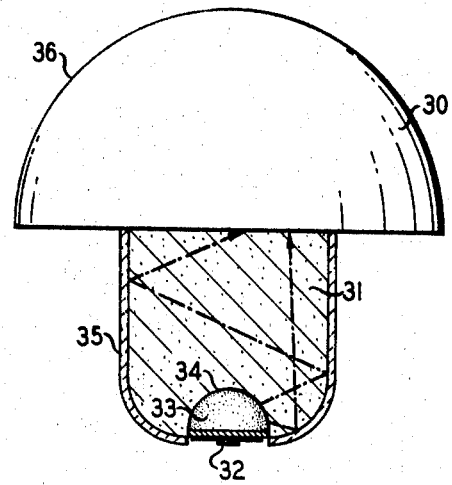
FIG. 3 is a front elevational view in section of yet another inventive structure of particular utility where the infrared absorption level within the phosphor is low.

The configuration of FIG. 3 is most usefully employed where the phosphor absorption for the diode emission is weak; that is, where the infrared would not be substantially totally absorbed within a phosphor layer which design considerations might otherwise dictate. In common with the other preferred configurations of the invention, final emission of visible radiation into the ambient is through the outer surface 36 of a hemispherical section 30. This section which in the optimum case is designed for the tangential extremal ray case, as described in conjunction with FIG. 1, has an index of refraction which is matched to that of phosphor section 31. This phosphor section 31 is composed of one of the same class of up-converting compositions previously discussed and serves the usual function of producing visible radiation from emission produced by a diode 32.

Diode 32, which may have the detailed structure of the diode included in the structure of FIG. 1, is again provided with a hemispherical section 33 which may be composed of bulk gallium arsenide or of other index-matched material. In common with the hemispherical sections of FIGS. 1 and 2, the relative radial dimensions of the junction diode 32 and that of the hemispherical section 33 are desirably such as to produce extremal ray tangential transmission through the hemispherical interface 34 into phosphor 31. The structure of FIG. 3 differs from the others discussed in the provision of a reflective coating 35 which is reflecting for the infrared emission of diode 32 and also for the visible emission of phosphor section 31. The height of section 31 is chosen so as to yield substantially complete absorption of infrared emission. In order to maintain the infrared intensity throughout 31 near its maximum value at the surface 34, the cross-sectional area of 31 is to be maintained as small as possible. However, it should be large enough and of such shape as to prevent significant radiation back into the dome 33. The relative diameters of the interface of sections 31 and 30 and of hemispherical section 30 are ideally determined in accordance with the principles discussed above so as to yield extremal ray tangential transmission into the ambient surrounding hemispherical surface 36. The material of which section 30 is composed may be an "inert" material index-matched to phosphor 31 or, under certain circumstances, may be a body of the same material as that of section 31.

5. General Structure Considerations

Dimensions and configurations have been discussed in terms of optimum design. Significant advantage over presently available structures may still be gained while permitting some latitude. Optimum domed infrared structures presently available have an $r_j/r_d$ ratio of at least 3.35. For any conceivable up-converting solid-state phosphor of the nature discussed (second photon or higher order transition), a significant advantage in overall efficiency and in output intensity is realized for an $r_j/r_d$ ratio of 2.5 or smaller. For a typical phosphor having a refractive index of two and based on pure second photon conversion, the advantage gained is by a factor of about 3.75. The optimum case, however, is that in which the design is based on the conditions of equation (2).

In a preferred range, the structural dimensions are within ± 30 percent or ± 35 percent of that indicated by equation (2) as discussed further on, since deviation by greater amount results in a brightness decrease of about 50 percent. (In the case of a larger $r_j/r_d$ ratio, the incident infrared emission on the phosphor is reduced so that visible brightness falls off at least as the second power; and, in the case of smaller $r_j/r_d$ ratios, internal infrared reflection and concomitant absorption of infrared within the diode is increased.)

Configurations have been discussed in terms of regular geometric shapes so that it has been assumed that diode junctions are generally round and centrally located, and domes are perfectly hemispherical. Of course, the same considerations upon which the invention is premised apply to irregular geometries and are beneficial to the extent that such irregular geometries approach the ideal. It is recognized that economic considerations in commercial production may dictate irregular geometries. For example, hemispherical sections may be produced simply by solidifying amorphous materials or composite materials in situ, while relying on surface tension, and other imperfectly controlled parameters to determine configuration.

The enumerated advantages are realized for any convex dome in which the radial dimension for at least 75 percent of the surface is within 60 percent of the optimum based on equation (2). A preferred range is defined for such irregular dome configurations in which 75 percent of the concerned curved surface is at a distance of ± 30 percent from the center point of the base of the dome, based on the same optimum value as determined from equation (2) and a more preferred range is set at 85 percent and ± 15 percent, respectively.

The same broad and preferred limits apply to the outer surface of succeeding layers such as phosphor layer 8 of FIG. 1 and to those of sections 15 and 30 of FIGS. 2 and 3, respectively. A disadvantageous effect of exceeding such limits has been generally described. For example, within domes of semiconductors or index-matched materials, exceeding the stated maxima results in a lessening of infrared intensity on the phosphor while use of smaller dimensions results in greater internal reflection with concomitant absorption loss of infrared.

Exceeding the stated limits in subsequent layers results ultimately in the same disadvantages. Generally, convex surfaces or interfaces are designed with a view of producing small structures which permit extremal ray tangential transmission. Use of smaller dimensions results in internal reflection and ultimately in absorption usually within diode sections although such loss may be minimized in certain structures as, for example, by the dielectric layer 23 of FIG. 2. Exceeding the maxima for convex surfaces other than that of the diode or diode-matched material is not as significant since the chief effect is only to increase the area of emission. (In this case, there is no loss of brightness in addition to that due to the inverse dependence on area as is produced within a conversion layer due to the square law or higher order dependence).

Where it is stated that phosphor layers are desirably of such dimension as to result in substantially total infrared absorption as, for example, in section 31 of FIG. 3, it is considered sufficient to absorb at least 75 percent of the infrared emission entering such region. Exceeding such dimension is generally of little consequence since phosphor materials of the nature described generally have low absorption for their own second or higher photon emission.

Configurations have been discussed in terms of circular diode junctions. Practical considerations may dictate other shapes; for example, the use of square diodes may be expedient. The small loss in overall efficiency may be of little consequence compared to the economies realized in production. Device operation is satisfactory for most purposes when the total junction area is such that the area defined by a circular junction, in accordance with equation (2), is approximated to the following extent: No more than 35 percent of the junction area should lie outside the circle and no more than 35 percent of the area within the circle should be unoccupied by the junction area. The latter limit is the more significant under most circumstances since it is concerned with ultimate brightness while the former is concerned largely with efficiency. A preferred limit on the portion of the circle unoccupied is about 20 percent.

The reasons for these limitations are as above described. To the extent that greater junction area lies outside the optimum circle, tangential extremal ray transition may not result, thereby producing excessive absorption loss of infrared. To the extent that greater area within the circle remains unoccupied, illumination intensity in the phosphor is reduced and visible brightness is concomitantly reduced by at least the second power of this decrease. Of course, still greater junction even—even encompassing the entire dome base further increases brightness, but, since efficiency is impaired, is not preferred.

Optimum structures, as described, provide also for reduction in scattering losses both at interfaces and between particles. In most cases, such losses are desirably minimized by filling interstitial regions with index-matched materials. In the optimum situation, matching is precise. However, real advantage is gained, in any event, by the use of any interstitial material having a refractive index substantially greater than one (the approximate index for the usual gaseous material which otherwise lodges in such interstitial positions). Since however, scattering losses are appreciably reduced only by use of material which is index matched to within ±10 percent, these limits are considered to represent a preferred range.

Similar considerations apply to dielectric matching layers and to reflecting layers, to additional matching regions, etc. Reflecting layers should be at least 95 percent reflecting, dielectric matching layers should be such as to result in no more than 10 percent loss by reflection, and matching regions should be matched to within ±10 percent.

What we claim is:

1. Electroluminescent device comprising an infrared-emitting diode composed of a material having a high absorption for its own emission together with a phosphor for converting said infrared to radiation in the visible spectrum characterized in that, the device configuration comprises a portion which may be approximated by a hemispherical section through which infrared emission may be transmitted, a centrally located portion of the base of which is occupied by a P-N junction, the relative sizes of the said hemisphere and said junctions are such that the numerical value of the ratio $r_j/r_d$ equals tan (Sin$^{-1}$ $n_2/n_1$), where $r_j$ is the radius of the junction, $r_d$ is the radius of the hemisphere, $n_2$ is the refractive index of the phosphor, and $n_1$ is the refractive index of the semiconductor, in which the approximation to the sphere is such that the curved surface is substantially entirely convex and 75 percent of its surface is spaced at a radial distance of ±30 percent of $r_d$, in which the approximation to a circular junction is such that a maximum of 35 percent of the junction area lies without the circular region defined by a centrally located circle of radius $r_j$ and a maximum of 35 percent of the area within such circle is unoccupied by the said junction, in which the said phosphor is contained within a region which is in intimate contact with a major portion of the curved surface of the said dome, and in which the said phosphor region is columnar with a surface removed from the said dome being substantially centrally located with respect to and in intimate contact with the flat surface of an additional dome of a transparent material having an index of refraction with ±10 percent of the said phosphor.

2. Device of claim 1 in which the said junction is that of a gallium arsenide diode.

3. Device of claim 1 in which the said hemispherical region consists essentially of gallium arsenide.

4. Device of claim 2 in which the said hemisphere consists essentially of a material having an index of refraction within 10 percent of that of gallium arsenide.

5. Device of claim 1 in which the said region consists essentially of particles of phosphor material with interstitial regions substantially filled by a transparent material having a refractive index within ±10 percent of the said phosphor.

6. Device of claim 1 in which the outer surface of the said region is dome shaped.

7. Device of claim 1 in which the outer surface of the said region is encompassed within an addition region of an additional material substantially transparent to the said visible emission, said additional material having a refractive index within ±10 percent of that of said region.

8. Device of claim 7 in which there is dielectric matching layer interposed between the said region and the said additional region.

9. Device of claim 1 in which a major portion of the exposed surface of the said columnar section is coated so as to be at least 95 percent reflecting with respect both to the said infrared emission and the said visible emission.

UNITED STATES PATENT OFFICE
CERTIFICATE OF CORRECTION

Patent No. 3,593,055            Dated July 13, 1971

Inventor(s) J. E. Geusic - H. E. D. Scovil

It is certified that error appears in the above-identified patent and that said Letters Patent are hereby corrected as shown below:

Col. 1, line 32, after "reflection" insert --(--.

Col. 1, line 50, after "has not" insert --been--.

Col. 2, line 35, after "solution" insert --growth N-type gallium arsenide layer 2 and solution--.

Col. 2, line 37, after "with" insert --an--.

Col. 2, line 66, delete "$Ga_{11x}In_xAsSi$" and insert --$Ga_{1-x}In_xAsSi$--.

Col. 5, line 56, after "smaller" delete "1".

Col. 6, line 64, delete "even" first use, and insert --area--.

Col. 7, line 21, change "junctions" to -- junction--.

Col. 7, line 23, change "$tan(Sin^1_1 n_2/n_1)$" to --$tan(sin^{-1} \frac{n_2}{n_1})$--

Col. 8, line 8, change "with" to --within--.

Col. 8, line 24, after "an" delete "addition" and insert --additional--.

Signed and sealed this 21st day of March 1972.

(SEAL)
Attest:

EDWARD M. FLETCHER, JR.
Attesting Officer

ROBERT GOTTSCHALK
Commissioner of Patents